(12) United States Patent
Chen

(10) Patent No.: US 10,162,192 B2
(45) Date of Patent: Dec. 25, 2018

(54) ASSEMBLY STRUCTURE FOR EYEGLASS LENS

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 0 days.

(21) Appl. No.: 15/414,974

(22) Filed: Jan. 25, 2017

(65) Prior Publication Data
US 2018/0210225 A1    Jul. 26, 2018

(51) Int. Cl.
*G02C 1/02*    (2006.01)
*G02C 5/14*    (2006.01)
*G02C 5/22*    (2006.01)

(52) U.S. Cl.
CPC ............... *G02C 1/02* (2013.01); *G02C 5/146* (2013.01); *G02C 5/22* (2013.01); *G02C 2200/32* (2013.01)

(58) Field of Classification Search
CPC . G02C 3/006; G02C 1/00; G02C 1/02; G02C 1/023; G02C 5/22; G02C 5/2209
USPC .................................................. 351/101, 110
See application file for complete search history.

(56) References Cited

U.S. PATENT DOCUMENTS

| | | | | |
|---|---|---|---|---|
| 5,592,242 A * | 1/1997 | Ooie | ........................ | G02C 1/02 351/105 |
| 6,164,776 A * | 12/2000 | Wu | ...................... | G02C 5/2263 351/110 |
| 6,394,599 B1 * | 5/2002 | Blanvillain | .............. | G02C 1/02 351/110 |
| 6,729,724 B1 * | 5/2004 | Jan | .......................... | G02C 1/02 351/110 |
| 7,472,990 B2 * | 1/2009 | Chen | ....................... | G02C 1/02 351/110 |
| 7,658,491 B2 * | 2/2010 | Siu | .......................... | G02C 1/02 351/110 |
| 9,022,557 B2 * | 5/2015 | Wang | ...................... | G02C 5/16 351/110 |
| 2017/0357104 A1 * | 12/2017 | Chen | ....................... | G02C 1/08 |

* cited by examiner

*Primary Examiner* — Robert E Tallman
(74) *Attorney, Agent, or Firm* — Rosenberg, Klein & Lee

(57) ABSTRACT

An assembly structure for eyeglass lens comprises a lens and a connection component. The lens is formed with an insertion section at one end which end toward to the connection component and at least one engaging hole in the insertion section. The connection component is formed with a slot at one end which end toward to the lens, and connected to a temple at the other end which end far away the lens. The slot is formed with a pin on the wall. After the insertion section of the lens is inserted into the slot of the connection component, the pin on the slot wall is engaged with the engaging hole of the insertion section, assembling the lens and the connection component together.

4 Claims, 4 Drawing Sheets

ASSEMBLY STRUCTURE FOR EYEGLASS LENS

BACKGROUND OF THE INVENTION

Field of the Invention

The present invention relates to an assembly structure for eyeglass lens. More particularly, an assembly structure for eyeglass lens has the characteristic that is convenient and rapid when assembled and that is stable and not easy to separate after assembled.

Description of Related Art

The basic structure of an eyeglass comprises a frame, lenses, and temples. The assembly of the lenses and the frame in the present eyeglass is as follows. The frame is formed with a notch to correspond to the lens assembling hole, making the lens assembling hole enlarge slightly because of the notch. After the lens is assembled to the lens assembling hole, a fastener is screwed to close the notch, making the lens set in the lens assembling hole of the frame stably. Then, the temples are hinged on the two lateral parts of the frame respectively to complete the assembly of the eyeglass.

However, the foregoing lenses of the eyeglass are assembled in the lens assembling hole of the frame stably by screwing the fastener, but in the actual use, it is discovered that during the assembling or disassembling process of the lenses and the lens assembling hole, the fastening element is fastened or loosen by a screwed tool. It is not only inconvenient during the assembling or disassembling process, if there is no appropriate screwed tool, the assembling or disassembling process of the lenses and the lens assembling hole cannot be processed. Therefore, the whole assembly structure design of the eyeglass still has the space to improve.

SUMMARY OF THE INVENTION

Accordingly, the object of the present invention is to provide an assembly structure for eyeglass lens, in which a lens is connected with a connection component, that is hinged on a temple, by the engagement of a pin and an engaging hole to make the lens and the connection component connect correctly.

For the above object, an assembly structure for eyeglass lens comprises a lens and a connection component. The lens is formed with an insertion section at one end which end is toward the connection component and at least one engaging hole in the insertion section. The connection component is formed with a slot at one end which end is toward to the lens, and connected to a temple at the other end which end is farther away from the lens. The slot is formed with a pin on the longitudinal wall to correspond to the engaging hole. The insertion section of the lens is inserted into the slot of the connection component, and the pin is engaged with the engaging hole, assembling the lens and the connection component together.

According to an embodiment of the present invention, the protruding height of the pin is higher farther away from the lens.

According to an embodiment of the present invention, the assembly structure of the eyeglass lens further comprises a groove at the end of the connection component connected to the temple, a first opening and a second opening in the groove and respectively toward to the temple and a wearer, in which the first opening and the second opening is communicated with each other, a locking hole and a through hole respectively in the upper wall and in the lower wall of the groove. A hinge member is formed at one end of the temple that toward to the connection component, and inserted into the groove of the connection component. A mounting hole is in the hinge member, thereby a fastener inserting into the through hole, the mounting hole, and the locking hole to assemble the temple and the connection component together.

The assembly structure for eyeglass lens of the present invention has the advantage as following:

In the assembly structure for eyeglass lens of the present invention, the insertion section of the lens is inserted into the slot of the connection component, and then the pin on the wall of the slot is engaged with the engaging hole of the insertion section to assemble the lens with the connection component. Therefore, it is convenient and rapid when assembled, and it is stable and not easy to separate after assembled.

DETAILED DESCRIPTION OF THE PREFERRED EMBODIMENT

Figure 1:
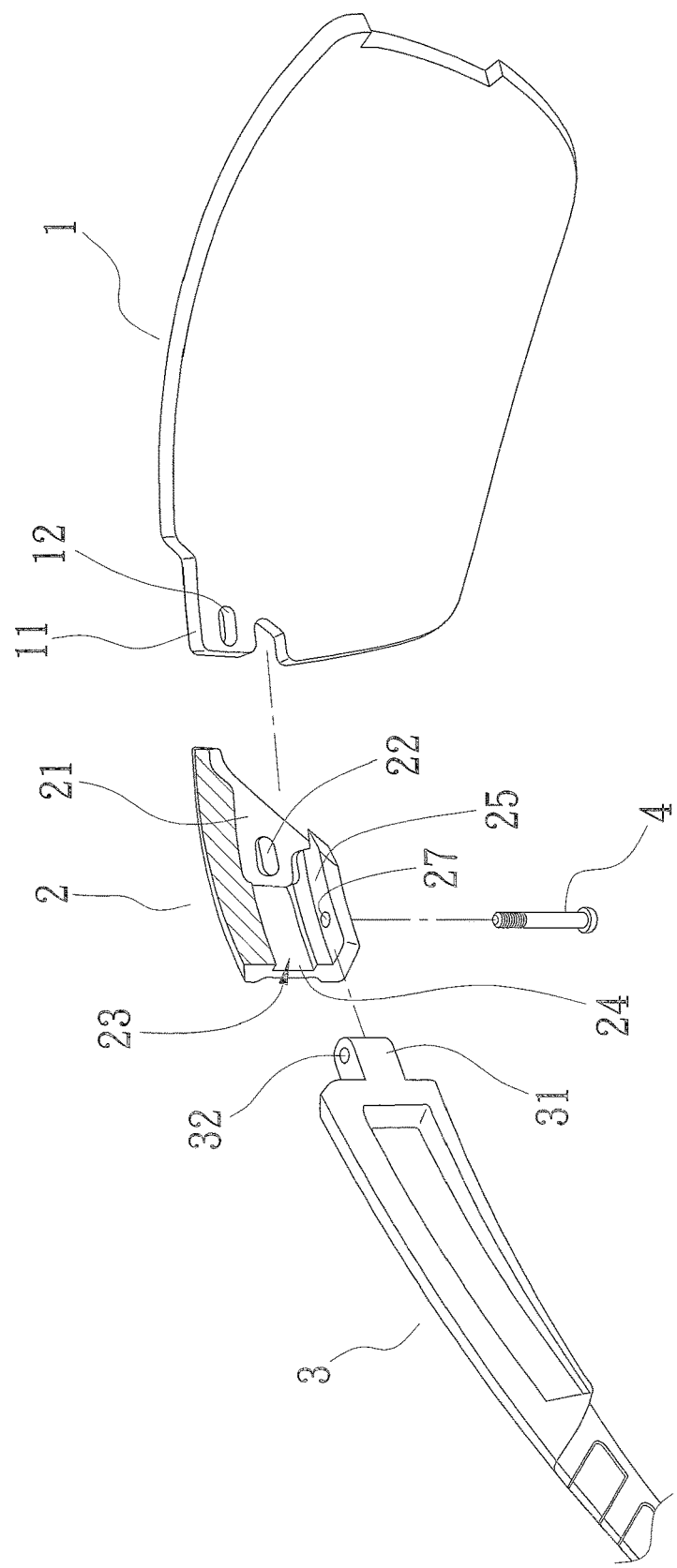
FIG. 1 is a three-dimensional exploded view of an assembly structure for eyeglass lens according to an embodiment of the present invention.

Please refer to FIG. 1, which is a three-dimensional exploded view of an assembly structure for eyeglass lens according to an embodiment of the present invention. An assembly structure for eyeglass lens comprises a lens 1 and a connection component 2. One end of the lens 1 is assembled to the connection component 2, and the end of the connection component 2 that is farther away from the lens 1 is hinged on a temple 3.

The lens 1 is formed with an insertion section 11 at one end which end is toward the connection component 2, and at least one engaging hole 12 is in the insertion section 11. According to an embodiment of the present invention, the insertion section 11 is formed with one engaging hole 12.

The connection component 2 is formed with a slot 21 at one end which end is toward the lens 1. A pin 22 having a height is laterally protruded on the longitudinal wall of the slot 21 and is corresponded to the engaging hole 12.

Figure 2:
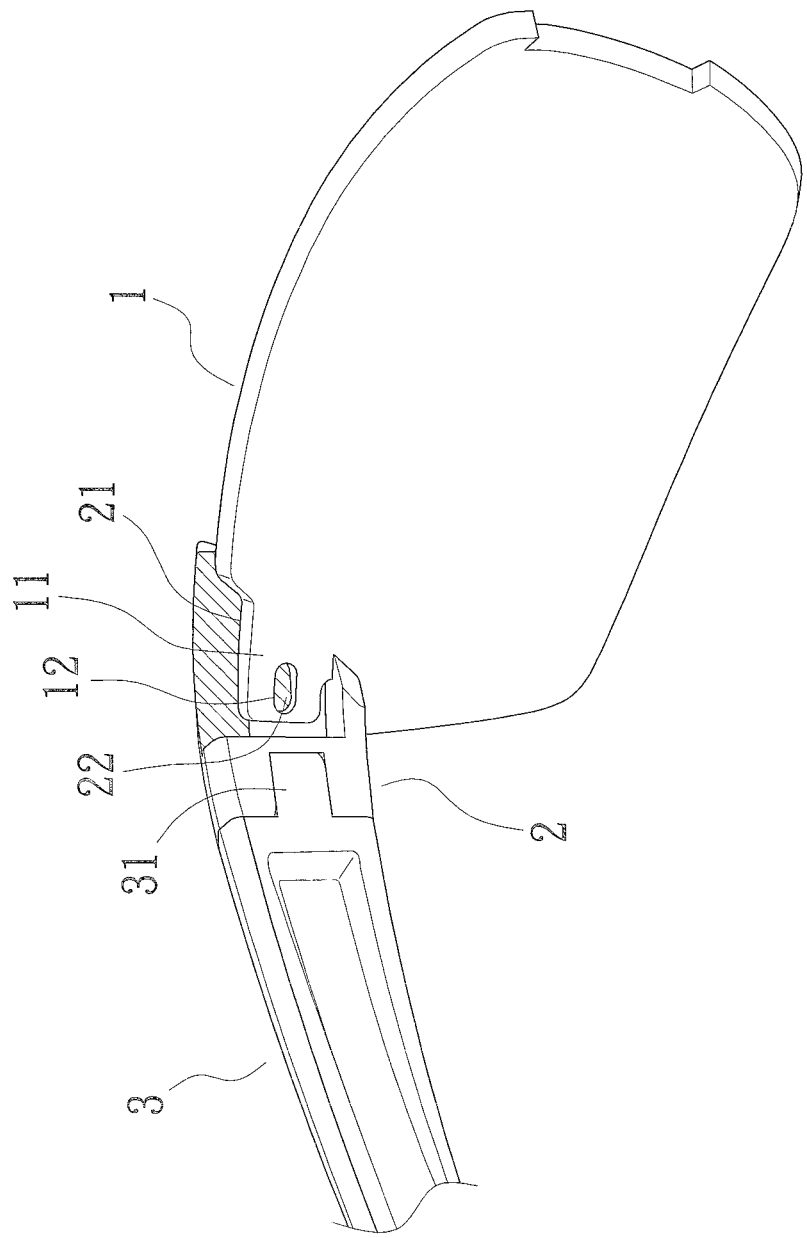
FIG. 2 is a three-dimensional perspective and partial sectional view of an assembly structure for eyeglass lens according to an embodiment of the present invention.
Figure 3:
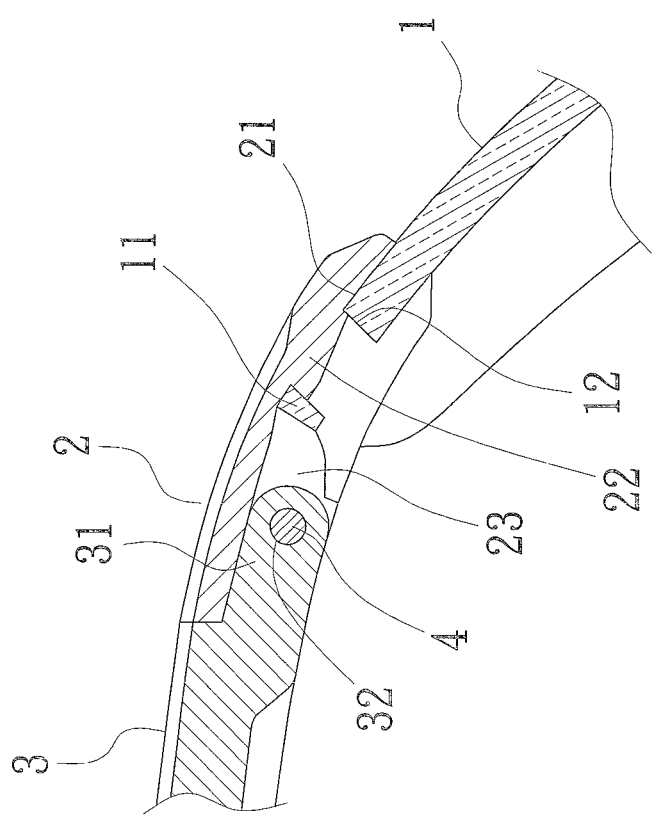
FIG. 3 is a top sectional view of an assembly structure for eyeglass lens according to an embodiment of the present invention.
Figure 4:
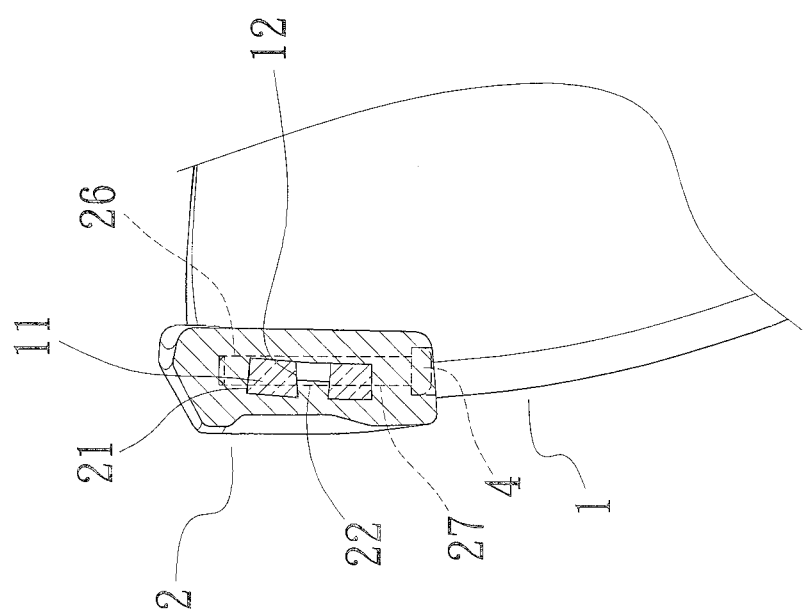
FIG. 4 is a side sectional view of an assembly structure for eyeglass lens according to an embodiment of the present invention.

Please refer to FIG. 2 to FIG. 4. When assembled, the insertion section 11 of the lens 1 is inserted into the slot 21 of the connection component 2, making the pin 22 in the slot 21 of the connection component 2 engage with the engaging hole 12 in the insertion section 11 of the lens 1, assembling the lens 1 and the connection component 2 together stably.

According to an embodiment of the present invention, the protruding height of the pin 22 is higher farther away from the lens 1. After the insertion section 11 of the lens 1 is inserted into the slot 21 of the connection component 2, the pin 22 in the slot 21 is stably engaged with the engaging hole 12 in the insertion section 11 and not easy to separate, please refer to FIG. 3 and FIG. 4.

According to an embodiment of the present invention, a groove 23 is formed at the end of the connection component 2 connected to the temple 3, and a first opening 24 and a second opening 25 are in the groove 23 and respectively toward to the temple 3 and a wearer, in which the first opening 24 and the second opening 25 are communicated with each other. A locking hole (26) and a through hole 27 are respectively in the upper wall and in the lower wall of the groove 23. A hinge member 31 is formed at one end of the temple 3 that toward to the connection component 2, and inserted into the groove 23 of the connection component 2 from the first opening 24. A mounting hole 32 is longitudinal formed in the hinge member 31, thereby a fastener 4 inserting into the through hole 27 in the connection component 2, the mounting hole 32 in the hinge member 31, and the locking hole 26 in the connection component 2 to assemble the temple 3 and the connection component 2 together, please refer to FIG. 1, FIG. 2, and FIG. 3.

What is claimed is:

1. An assembly structure for eyeglass lens, comprising:
    a lens formed with an insertion section at one end and at least one engaging hole in the insertion section; and
    a connection component formed with a slot at one end for receiving the insertion section of the lens and another end connected to a temple, wherein the slot is formed with a pin on a longitudinal wall to correspond to the engaging hole and insert into the engaging hole for assembling the lens and the connection component together, the pin protruding fixedly from the longitudinal wall with increased protruding height farther away from the lens.

2. The assembly structure for eyeglass lens according to claim 1, wherein the protruding height of the pin defines a surface inclined away from the lens.

3. The assembly structure for eyeglass lens according to claim 1, further comprising:
    a groove formed at an end of the connection component connected to the temple;
    a first opening formed in the groove and toward the temple;
    a second opening formed in the groove and toward a wearer and communicated with the first opening;
    a locking hole formed in an upper wall of the groove;
    a through hole formed in a lower wall of the groove;
    a hinge member formed at one end of the temple toward the connection component and inserted into the groove of the connection component; and
    a mounting hole formed in the hinge member, thereby a fastener inserts into the through hole, the mounting hole, and the locking hole to assemble the temple and the connection component together.

4. The assembly structure for eyeglass lens according to claim 2, further comprising:
    a groove formed at an end of the connection component connected to the temple;
    a first opening formed in the groove toward the temple;
    a second opening formed in the groove toward a wearer and communicated with the first opening;
    a locking hole formed in an upper wall of the groove;
    a through hole formed in a lower wall of the groove;
    a hinge member formed at one end of the temple toward the connection component and inserted into the groove of the connection component; and
    a mounting hole formed in the hinge member, thereby a fastener inserts into the through hole, the mounting hole, and the locking hole to assemble the temple and the connection component together.

* * * * *